A. G. HASKELL.
WATER-PIPE.

No. 185,396. Patented Dec. 19, 1876.

WITNESSES
Frank G. Parker
Horace E. Morse

INVENTOR
Asa G. Haskell
by J. H. Adams
Atty.

UNITED STATES PATENT OFFICE.

ASA G. HASKELL, OF NORTH ANDOVER, MASSACHUSETTS.

IMPROVEMENT IN WATER-PIPES.

Specification forming part of Letters Patent No. 185,396, dated December 19, 1876; application filed March 1, 1876.

*To all whom it may concern:*

Be it known that I, ASA G. HASKELL, of North Andover, in the county of Essex and State of Massachusetts, have invented an Improved Non-Freezing Water-Pipe, of which the following is a specification:

The object of my invention is to provide a means for the prevention of the freezing of water in water-pipes, and also a means of thawing out the pipes in the event of water freezing in the same.

The invention consists in the arrangement of one pipe within another, so as to leave a space between the two, the said double pipe to commence at a point near the faucet, and extend to a point where the pipe is sufficiently protected from the action of frost. In the space between the two pipes may be placed a small tube, or a wire arranged spirally around the inner pipe, so that, if a tube, warm water may be poured in to impart heat to the inner pipe in case the water should be frozen in the same, and if a wire, the warm water may be carried around the outer surface of the inner pipe for the same purpose.

Figure 1:
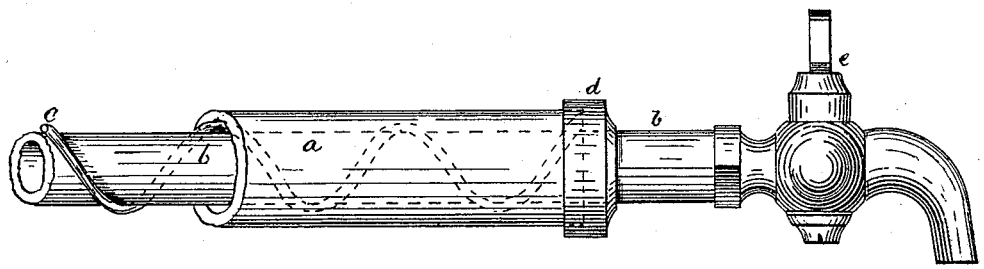
Figure 2:
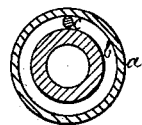

My invention is represented in Figure 1 of the accompanying drawing, Fig. 2 being a section of the same.

*b* represents a water-pipe, having a faucet, *e*, at its outer end. Surrounding the pipe *b*, and commencing at a point near the faucet, is a pipe, *a*, sufficiently large to make a space between the two pipes. On the end of the pipe *a* is a cap, *d*, which closes the space between the pipes *a* and *b* at that point. In the space between the pipes *a* and *b* is a wire, *c*, which commences at the end of the outer pipe *a*, and extends to a point where the pipes are sufficiently protected from the action of the frost or cold upon the water in the pipe. The wire *c* is arranged spirally around the inner pipe, so as to form a spiral passage between the coils. This is for the purpose of allowing hot water, which is to be poured in at the end of the pipe *a*, to circulate around the pipe *b* in case it becomes necessary to thaw out any ice that may have formed in the said pipe. This portion of the pipe is supposed to be in a vertical position to allow the water to pass freely.

Instead of the wire *c*, a small tube may be used, and arranged in the same manner as the wire, so that hot water may be passed through the said tube instead of in the space between the coils of the wire.

As a general thing, it is believed that the air-space between the tubes *a* and *b* will be sufficient to prevent the freezing of water in the pipe *b*; but should the water be frozen, a stream of hot water made to pass around the spiral passage, or through a small tube surrounding the inner pipe, will sufficiently heat the tube or pipe and cause the ice to melt.

I claim as my invention—

The combination of the inner pipe *b*, the outer surrounding pipe *a*, connecting-cap *d*, and the wire or tube *c*, substantially as and for the purpose specified.

In testimony whereof I have signed my name to this specification in the presence of two subscribing witnesses.

ASA G. HASKELL.

Witnesses:
J. H. ADAMS,
E. A. STOCK.